United States Patent [19]
Hotaling et al.

[11] Patent Number: 5,838,436
[45] Date of Patent: Nov. 17, 1998

[54] MULTI-PURPOSE QUANTUM COMPUTING

[75] Inventors: Stephen P. Hotaling, Cicero; Andrew R. Pirich, Marcy, both of N.Y.

[73] Assignee: The United States of America as represented by the Secretary of the Air Force, Washington, D.C.

[21] Appl. No.: 824,891

[22] Filed: Mar. 26, 1997

[51] Int. Cl.$^6$ .................................................. G01B 9/02
[52] U.S. Cl. ................................ 356/345; 359/1; 359/15; 365/216
[58] Field of Search .................................. 356/345; 359/1, 359/11, 15; 365/215, 216

[56] References Cited

U.S. PATENT DOCUMENTS

| | | | |
|---|---|---|---|
| 4,948,959 | 8/1990 | Houk et al. | 364/746 |
| 5,530,263 | 6/1996 | DiVincenzo | 257/14 |

*Primary Examiner*—Samuel A. Turner
*Attorney, Agent, or Firm*—Thomas C. Stover

[57] ABSTRACT

Method and apparatus are provided for a general purpose photonic computer. A data signal is input through an encoder to encode such signal with an instruction. The encoded signal is transmitted by means of a laser beam to an input buffer where it interferes with a reference beam so as to form an interference pattern therein as a hologram, IPH. A read beam is directed through the IPH and through a decoder which reads the instruction as having, e.g. an OP Code, data source and destination. The decoded instruction is forwarded on the read beam to ALU spin media which respond to the instruction by flipping spins between >2 energy levels, in one or more sequences of data patterns which are read or measured by one or more sensors. Such sensors can be one or more of RF, microwave or optical sensors, which sensors output radix >2 data signals for, e.g. storage, display or further processing as desired. Thus the present invention teaches a novel exploitation of photon-induced, quantum-mechanical spin transitions in spin media. The input signal can be from a keyboard, camera, bar code or other input source.

26 Claims, 8 Drawing Sheets

| TABLE 1 | |
|---|---|
| OPCODE | ACTION |
| IMAGE DATA | MOVE |
|  | STORE AT ADDRESS A |
|  | ADD A AND B (+) STORE SUM IN ACCUMULATOR C |
|  | CORRELATE A AND B |
|  | OUT A |

FIG. 4

NUCLEAR (1) AND ELECTRONIC SPINS: TYPICAL SPIN MEDIA

ENERGY STATE DIAGRAM FOR NUCLEAR AND ELECTRONIC STATES IN THE SPIN MEDIA $|++\rangle$ $|+-\rangle$ $|-+\rangle$ $|--\rangle$

HYPERFINE STRUCTURE OF A
HAMILTONIAN SPIN SYSTEM

ENERGY LEVEL DIAGRAM OF A
4 STATE SYSTEM

MULTI-PURPOSE QUANTUM COMPUTING

STATEMENT OF GOVERNMENT INTEREST

The invention described herein may be manufactured and used by or for the Government for governmental purposes without the payment of any royalty thereon.

FIELD OF THE INVENTION

This invention relates to optical computing and optical signal processing realizations including the provision of a general purpose optical computer.

BACKGROUND OF THE INVENTION

In 1937, A. Turing proved that a "universal digital computer", having a finite number of components could be realized. This Universal Turing Machine (UTM) could be achieved by decoding information stored on it by an arbitrarily long input tape. Later, John von Neumann applied Turing's thesis to the design of what became the first modern SIMD (single instruction multiple data path) computer architecture. Von Neumann's computational engine was realized as combinations of three elements: memory, processor and switch (MPS structures) which included electronic transistor and diode logic based Boolean digital logic elements (radix=2).

In such prior art electronics components, indicated in FIG. 1, the hardware elements are supported by an instruction set architecture. This instruction set and its associated encode/decode hardware architecture, provide the operational codes (OP Code) and data flow instructions necessary for general purpose arithmetical, logical, and data flow control programming. Later, researchers extended the von Neumann architecture to parallel, or multiple instruction, multiple data path (MIMD) architectures.

The advent of photonics led to massively parallel optical computer concepts which carried the Turing thesis further, but lacked the general purpose programmability of the older digital hardware. Thus, the virtually infinite signal/data bandwidth of the photonic (or optical) computer remains to date an under utilized advantage of photonics. Because of the lack of a general purpose programmable instruction set architecture, optical computers have not emerged as a viable contender for SIMD or MIMD digital computers-these hardware realizations (e.g. optical neural networks are relegated to special purpose processing tasks such as optical signal processing. That is, optical computers have served only as add-ons to electronic computers.

For examples of optical special purpose computers, see U.S. Pat. No. 4,910,699 to Capps et al (1990), U.S. Pat. No. 4,948,959 to Houk et al (1990) and U.S. Pat. No. 4,387,989 to Pirich (1983). Inherent in the above optical systems is a lack of dynamic programmability and general purpose computability. Thus the linking of electronic computers with special purpose optical signal processors is the current state of the prior art.

Also electronic computer systems require considerable electric power, often have limited data capacity and can be relatively slow and there is a need and market for a general purpose computer that exhibits marked improvement in all three of these categories.

There has now been discovered a general purpose quantum computer that provides for the creation of an instruction set architecture and thus a dynamically programmable photonic universal Turing machine (UTM).

SUMMARY OF THE INVENTION

Broadly the present invention provides a method for general purpose quantum computing that includes the steps of:

a) inputting a data signal through an encoder to encode the data signal with an instruction of OP Code data source and destination, b) transmitting the encoded signal by means of a light beam L1 to an input buffer, c) directing a reference light beam L2 so it interferes with the L1 beam in the buffer to form an interference pattern therein as a hologram, IPH.

Further of such steps include:

d) directing a read light beam L3 through the IPH and through a decoder which reads the instruction, e) the decoder presenting the instruction to ALU spin media which responds to the instruction by flipping spins in one or more sequences to resulting data patterns and reading or measuring such patterns to derive results therefrom.

The invention further includes a method for flipping spins between more than two (>2) energy levels or >2 level spin states.

The invention also provides an apparatus for carrying out the above method.

DEFINITIONS

By "encoding" as used herein, is meant adding instructions to a data signal such as shown in FIGS. 3 and 4 hereof.

By "decoding" as used herein, is meant reading the data signal and its instructions for further processing.

By "quantum computing" as used herein, is meant the employment of the spin of subatomic particles to process data.

By "system Hamiltonian" as used herein, is meant a series of energy levels relative to spin states in spin media, as illustrated in FIGS. 7 and 12 hereof and further discussed below.

By ">2 level spin states" as used herein, is meant flipping interactive nuclear ("n") spins (proton spins) and electronic ("e") spins between >2 energy levels per FIGS. 7, 10, 11 & 12, to obtain >2 energy level data or radix >2 (R>2) data.

BRIEF DESCRIPTION OF THE DRAWINGS

The invention will become more apparent from the following detailed specification and drawings in which:

FIG. 4 is schematic diagram of an operational code (OP Code) employed in the instruction of FIG. 3;

DESCRIPTION OF THE PREFERRED EMBODIMENTS

Figure 1:
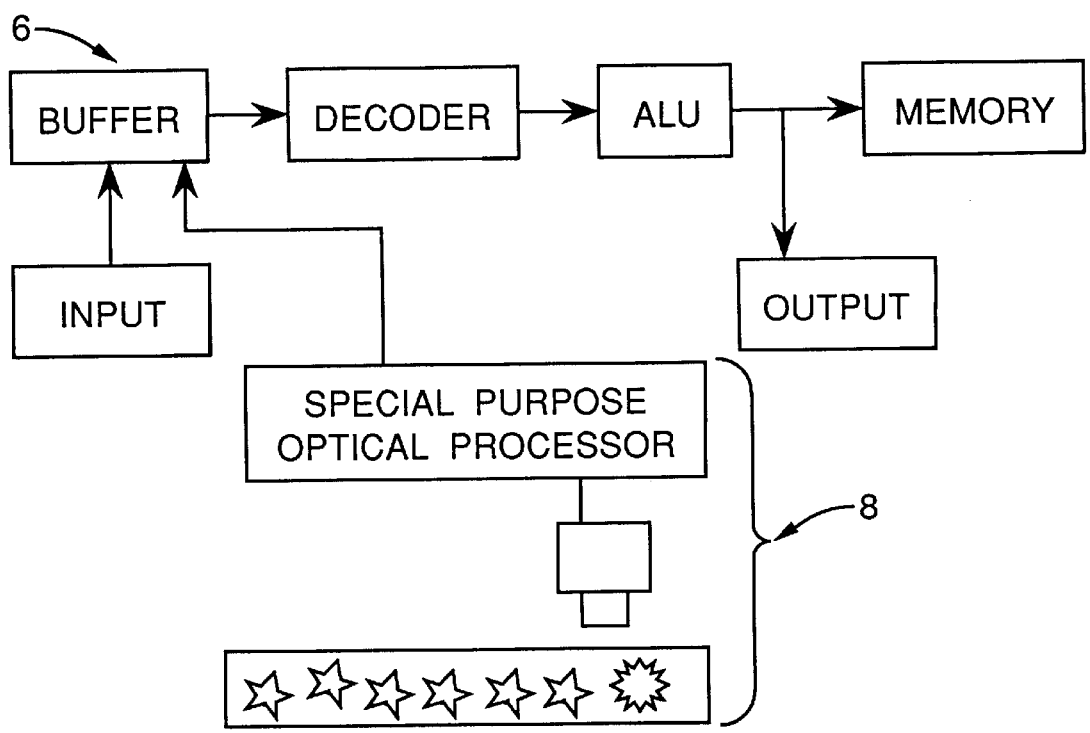
FIG. 1 is a block diagram, partially schematic view of a prior art electronic computer.

The state of the prior art as shown in FIG. 1 wherein a representative electronic general purpose computer 6 is linked to a special purpose optical processor 8, as shown.

Figure 2:
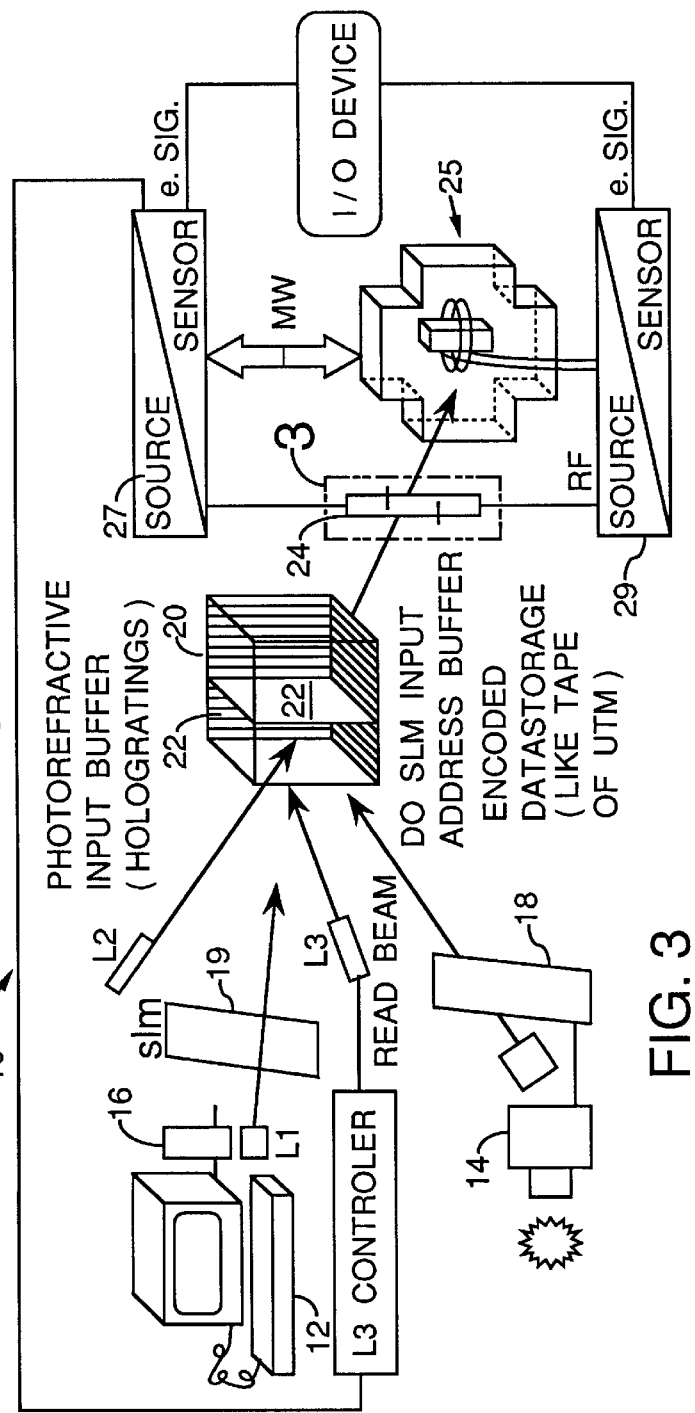
FIG. 2 is a schematic perspective, partial block diagram of a quantum computer embodying the present invention.

FIG. 2 illustrates the present invention as a schematic block diagram. Data is input to a computer using a variety of input devices including keyboard, digital or analog cameras, digital computer, bar code scanner or other data input device. In the case of image data, the data to be input to the UTM may be entered using a spatial light modulator, SLM. The specific data format is made compatible with the SLM through a custom interface. The input device has encoded commands using OP Codes from the UTM instruction set. An example of a UTM instruction set is given in FIGS. 3 and 4. FIG. 4 is illustrative of a subset of the UTM instruction set, since new commands can be created by the user (i.e. the device may be programmed locally). FIG. 4 thus represents the instruction set architecture concept.

Figure 3:
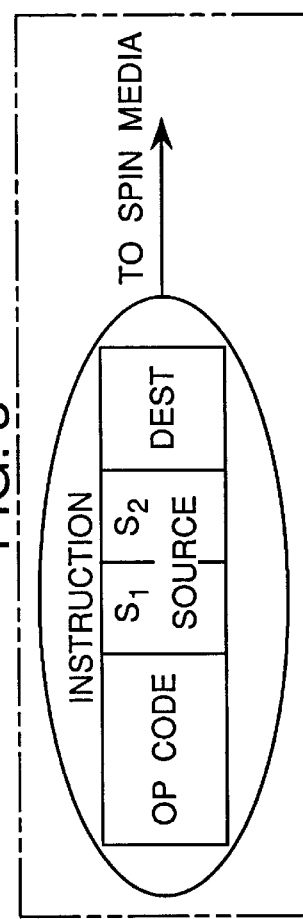
FIG. 3 is a schematic diagram of an instruction employed in a computer embodiment of the present invention.

Again referring to FIG. 2, the SLM image data or signal is presented to an input buffer (e.g. a photorefractive crystal) 20 in which is formed an input holographic instruction page 22, which includes the optical, data source and destination memory locations per FIG. 3. The hologram is essentially the physical enstantion of the instruction. The input instructions (and data) can now be manipulated heuristically as in a digital computer. The instruction contains the OP Code (as shown in FIG. 3) and the source and destination locations for the data and the operation result. For example, an addition operation contains source and destination locations of the operands (e.g. 5+2=). In a dynamically programmable UTM, the user (or the program) may choose these on the fly, suggesting the possibility of using the present invention in, e.g. artificial intelligence applications such as autonomous IMINT (image intelligence) agents.

The buffered instructions are sequentially read from the input buffer 20 by laser read beam L3. The instruction passes through a decoder 24. The decoder can be an optical correlator, e.g. another photorefractive crystal.

Referring in more detail to FIG. 2, it can be seen that there are two inputs to the input buffer 20, one being the keyboard input 12 and the other being the image input 14, either of which passes through a custom interface encoder (16 or 18) to the input buffer 20. For example from input 12 and the custom interface encoders 16, a laser beam L1 transmits encoded data through an SLM 19 to the input buffer 20, per FIG. 2. The beam L1 carries information in a crossword puzzle-like pattern and meets or interferes with a reference laser beam L2 in the input buffer 20, which records such interference as an interference pattern or holographic grating 22, as shown in FIG. 2. Then a read-beam laser L3 is directed through the holographic grating 22 and through a decoder 24.

Figure 9:
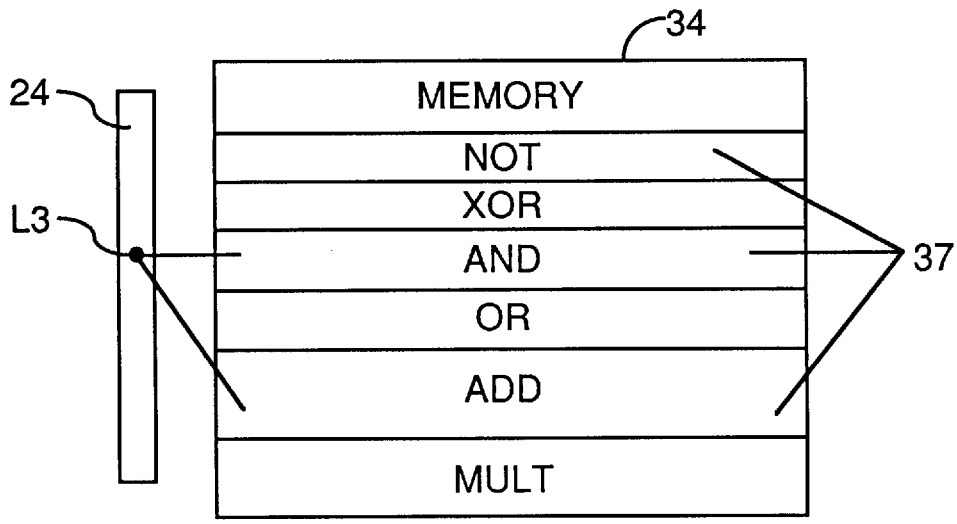
Figure 10A:
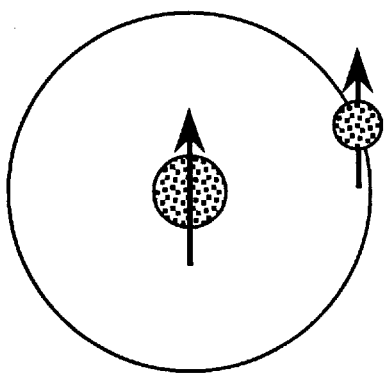
FIGS. 10 and 11 are schematic elevation views which illustrate >2 energy levels of "n" and "e" spin states and FIG. 12 is a graph showing an example of such >2 energy levels or states.
Figure 10B:
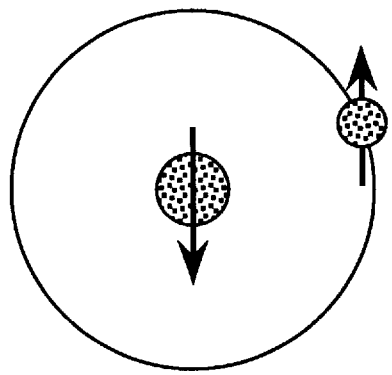
Figure 10C:
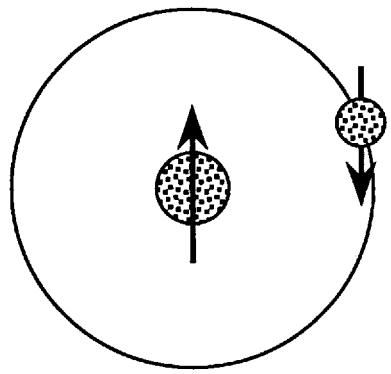
Figure 10D:
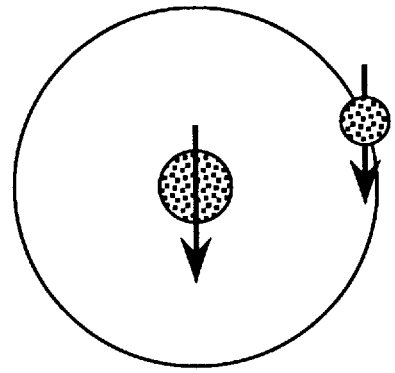

Note that the encoder 16 (or 18) gives instruction per FIG. 3, to the incoming signal or data and the decoder 24 reads such instruction in decoding the data and passes same to a designated destination in the spin media. The spin media is programmed in layers 37 to perform certain instruction commands or responses such as "add" and "correllate" per FIGS. 3 and 4. Accordingly, the decoder 24 reads the IPH on read beam L3 and directs the instruction to the appropriate layer 37 of the spin media 34 per FIGS. 5 and 9 hereof.

As indicated in FIG. 3, the encoded and decoded instruction have three components, the OP Code, the data sources (eg. $S_1$ and $S_2$) and destination locations or layers per FIG. 9. The so decoded data, (e.g. 5+2=) is passed to the "add" layer 37 of the spin media per FIG. 9, to calculate the operational result of such instruction.

Thus $S_1$ can be data from a keyboard and $S_2$, data from a camera or memory unit. The instruction gives the OP Code as, eg. "add" or "Xor", designates the source as, eg. from memory and gives the destination as, eg. the "add" or "Xor" layer 37 in the spin media per FIG. 9.

The decoded instruction passed through the decoder 24 on read beam L3, passes to the destination layer of the data processor of the invention. Such processor has paramagnetic spin media in each layer with interacting nuclear and electronic spins and a spin sensing apparatus and is known herein as the ALU (Arithmetic Logical Unit) quantum processor of the invention.

The spin sensing apparatus can include microwave (MW) and radio frequency (RF) source and sensor units, waveguide and transmission lines for coupling the MW and RF energy to the spin sample and a magnetic material providing an AC modulated DC magnetic field of intensity B. Photonic perturbation of spin states results in spin inversion of a plurality of the spins. The radio frequency and microwave source/sensor units are shown in the schematic block diagrams of FIGS. 2 and 5 and further discussed below.

Figure 7:
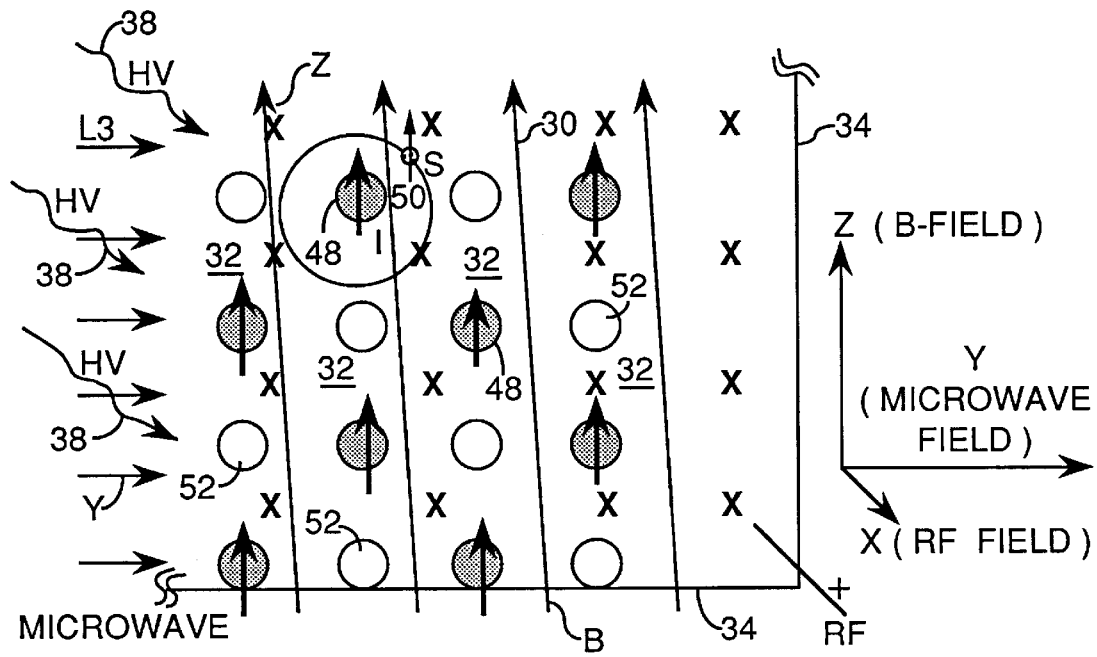
FIG. 7 is a schematic diagram of spin media employed in a computer embodying the present invention.
Figure 8:
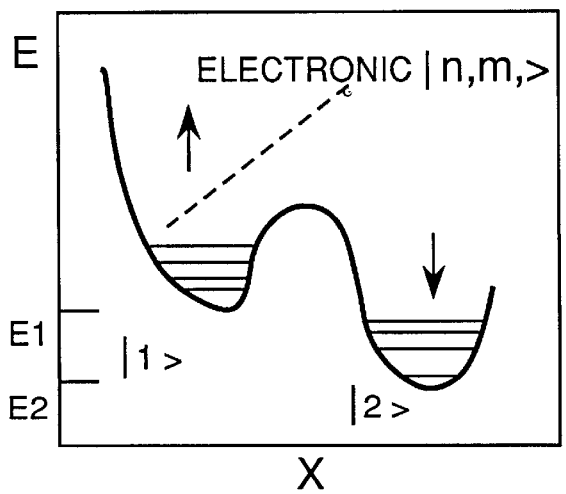
FIG. 8 is a graph showing energy states of spins of spin media employed in a quantum computer embodying the present invention and FIG. 9 is a schematic elevation view of layered destinations in spin media per the invention.
Figure 12:
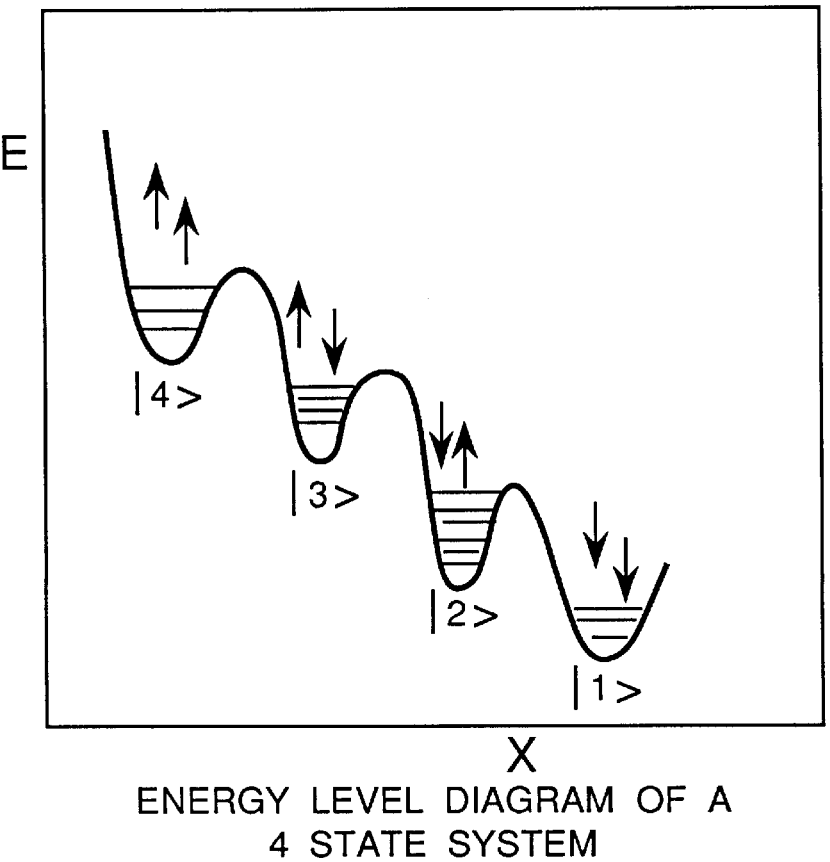

Also FIG. 7 illustrates a schematic of a ALU spin media having both electronic and nuclear spins interacting. The interaction is determined by the spin Hamiltonian. A schematic energy state programmed for a two-level (nuclear 1+> and 1–> state) system is shown in FIG. 8 (as more fully described in a companion application filed herewith. And a >2 level, eg. a 4 energy level system per the present invention, is shown in FIG. 12. In each of the systems, the data is decoded and processed in the ALU spin media as spin state information. Transitions in spin state represent digital bit flips. Use of materials with multiple nuclear states, per the invention leads to multistate (radix>2) arthmetic.

For a further discussion on spin Hamiltonians see an Article entitled "Photon-Spin Interactions In Condensed Matter Photonic Systems: A Potential Foundation for Photonic Quantum Computing", in *Photonic Component Engineering and Applications,* SPIE 1996 Conf. Proc., A. R. Pirich, editor, SPIE PRESS by S. P. Hotaling, which Article is incorporated herein by reference.

Figure 5:
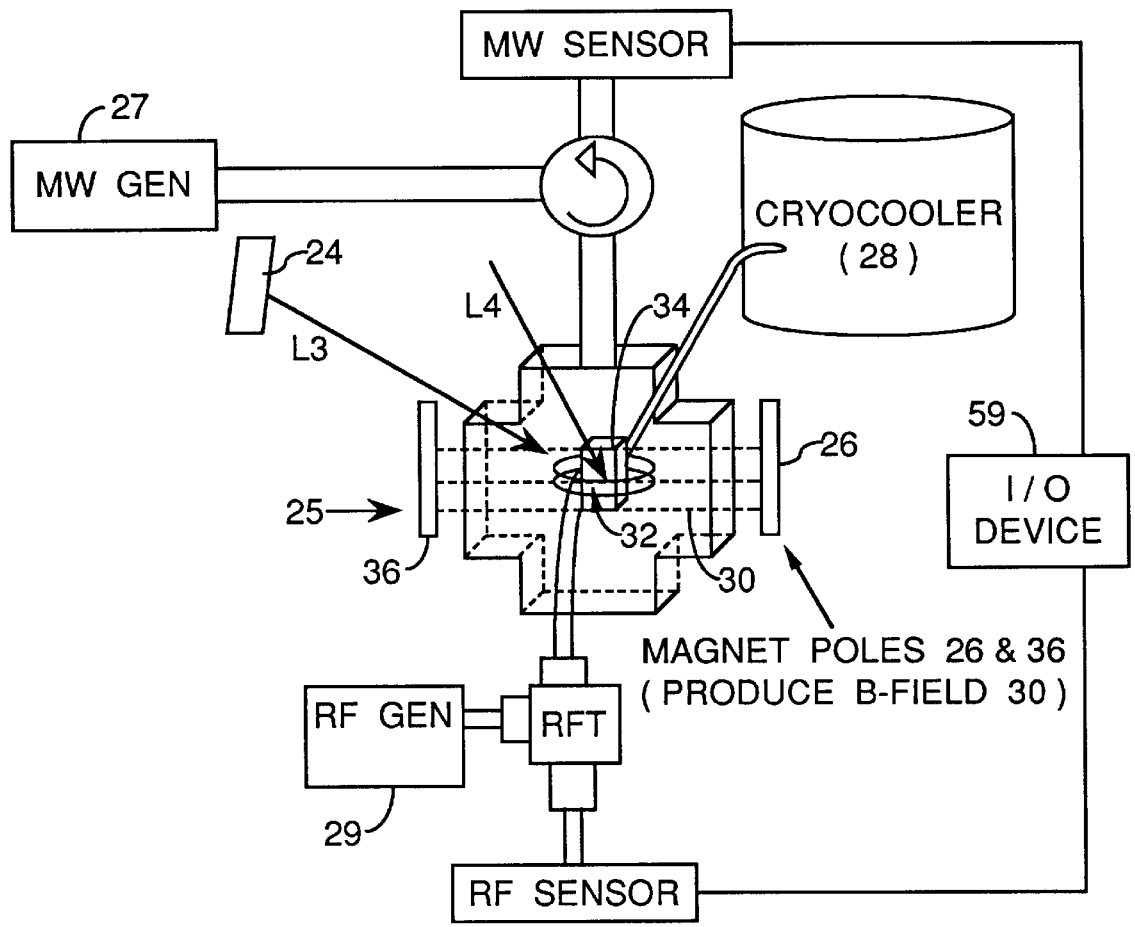
FIG. 5 is an elevation schematic block diagram, partially in perspective, of a component of a quantum computer embodiment of the invention.

As shown, the ALU quantum computer element 25 has magnets 26 and 36 which establish a magnetic field B having flux lines 30 across the spin media 32 housed in container 34 per FIGS. 5 and 7. Per FIG. 5, the spin media is cooled to a relatively stable temperature by cryocooler 28.

In addition to magnetic field B which operates on a z-axis, the microwave generator 36 transmits an MW field 38 across the spin media 32 on the y-axis per FIGS. 5 and 7. Also the RF generator 40 transmits RF waves through the spin media 32 on the x-axis, as shown in FIGS. 5 and 7. The x, y and z directions of the RF field, MW field and B field are shown schematically in FIG. 7.

In the spin media 32 per FIG. 7 are protons known as nuclear spins 48 which are excited by RF transmission as shown or indicated in FIGS. 5 and 7. Also in the spin media are unpaired electrons or electronic spins 50, which are excited by microwaves, as shown or indicated in FIGS. 5 and 7. Also there are atoms or molecules with no net spin, i.e. neutral atoms or molecules 52 as shown in FIG. 7.

Now the read beam L3, as it comes through the decoder 24 and into a layer 37 of the spin media 32, carries a decoded beam of photons in a data pattern. When the photons of such beam strike the nuclear spins and electronic spins, they invert according to the data pattern (decoded hologram or instruction) of such entering beam and the pattern of such spin inversions are read respectively by the MW sensor for the inversion pattern of electronic spins and by the RF sensor for the inversion pattern of the nuclear spins, as indicated in FIGS. 5, 7, 10 and 11, per the 4 energy levels shown in FIG. 12.

The above MW and RF sensors can read the resulting pattern of one sequence of spin flips or the resulting pattern of several or many sequences of spin flips which propagate until measurement and which represent one or more computational steps.

The spin media in each layer, can be programmed to respond in different ways or functions to the incoming data pattern in a logic gate type fashion, e.g. to perform Boolean logic functions according to a desired Hamiltonian.

That is, there are two types of Hamiltonians—those which can be controlled by external field perturbations (e.g. through photon-spin interactions) and those which can be programmed to run independent of external field interactions. For the former case, a spin flip interaction (for example—the result of a quantum computation) can be "clocked" by external photonic perturbation, eg. by an L4 laser beam directed into the spin media 34 per FIG. 5, which instructs such media when to take a measurement and output a data signal and when not to. That is, the spin flips in the spin media are running per the received instructions of the decoded beam L3 but a data signal therefrom is output only when the L4 beam so directs the spin media. Such L4 beam can thus have, eg. on-off instructions incorporated therein.

The result (e.g. 5+2=7) can be measured immediately upon completion of the computation (by, eg. RF, MW or optical sensor means) and then can be used as input ("prepared") to another quantum element or gate. One can envision a series of such quantum gates to form a quantum chain.

For the latter case (purely time-dependent Hamiltonian interaction), which is more common and a preferred embodiment of the invention, a quantum chain is presented with data at the input and as time evolves, the results of quantum calculations propagate in the spin media until measurement occurs, i.e. the resulting pattern is read by one or more of the above sensors in the absence of such L4 beam.

The decoded beam (of photons) L3 can come in at any angle relative to the above noted x, y and z directions into the spin media e.g. of FIG. 7, as desired within the scope of the invention.

Sensing of the inversions of nuclear and electronic spins by the MW sensor and RF sensor provides a relatively high speed stream of (>2 level spin state) data that can be optically read as data for arthmetic and logical operations.

When both the MW and RF sources/sensors are operating, each outputs a separate signal to the I/O device and such signals are processed to define a resultant output pattern using Electron Nuclear Double Resonance (ENDOR) techniques as known in the art.

For further information on RF and MW source/sensor units, see "Electrons Spin Resonance" by C. Poole and H. A. Farach, AIP Press 1994, which Article is incorporated herein by reference.

Figure 6:
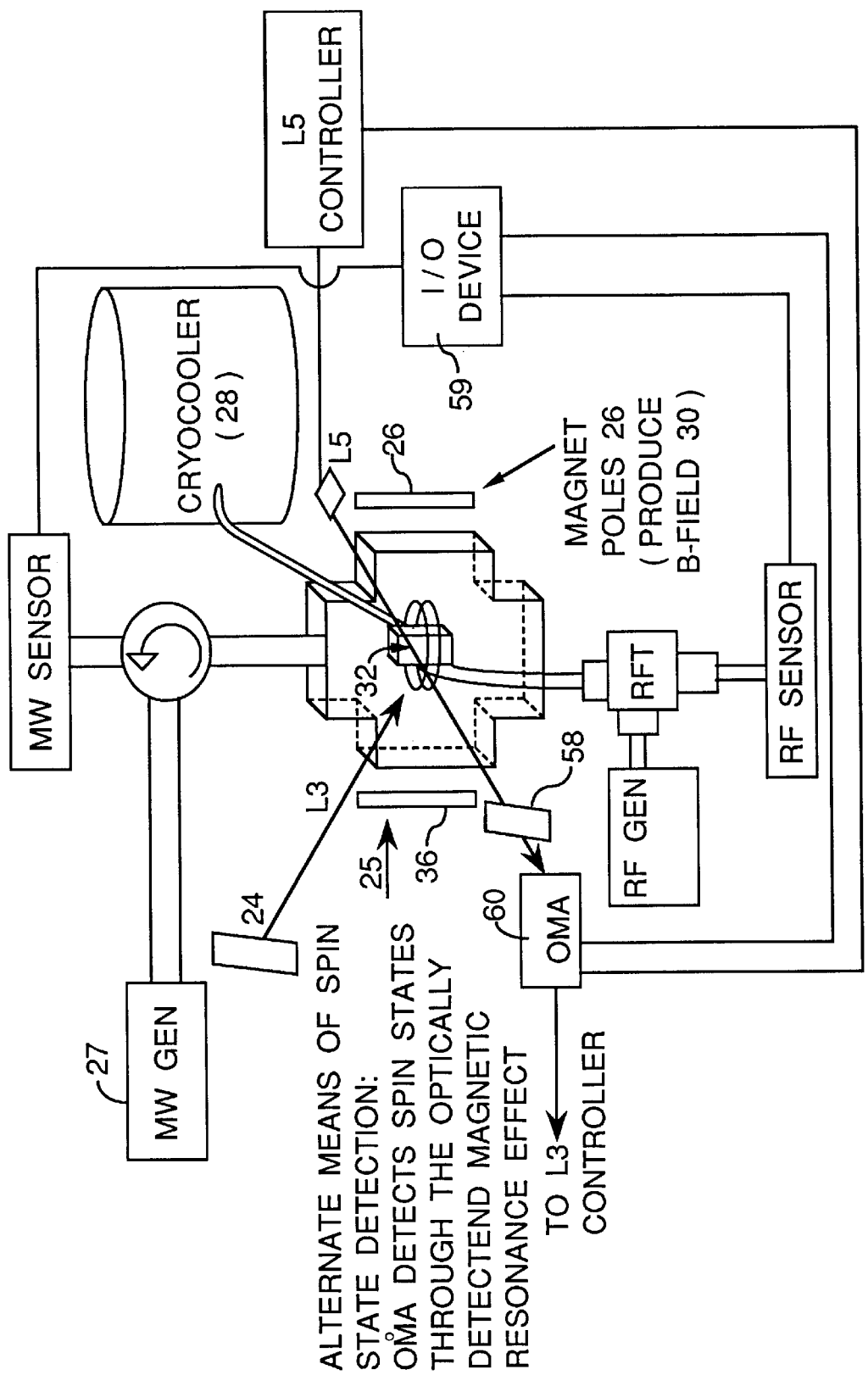
FIG. 6 is a schematic elevation block diagram, in partial perspective, of a component of another quantum computer embodying the present invention.

In other embodiments of the invention, either the MW or RF source/sensor unit is omitted in favor of using the other or both such units can be omitted and the above spin inversions read optically, e.g. by passing laser beam L5 through the spin media 32 to beam detector 58, per FIG. 6, which optically detects the above spin inversions in a data pattern and transmits same to an optical multi-channel analyzer (OMA) 60, which detects such spin flips by an optical frequency shift using optically detected magnetic resonance (ODMR) and outputs optical digital data therefrom for arthmetic and logical operations.

That is, the intensity of the B field is swept slowly and causes the spins to line up directionally, e.g. per FIG. 7. Then the photons arrive in a layer of the spin media as decoded data (in a pattern) on laser beam L3, which flip a plurality of the "n" and "e" spins, one or more times (in one or more sequences) from, e.g. upwardly to downwardly as indicated in FIG. 10, in a pattern according to the pattern of the decoded instructions on the L3 beam. These spin flips are sensed by the MW sensor and the RF sensor or one of them or by the OMA, as noted above and processed as stated above and output, e.g. for arthmetic and logical operations from I/O device 59, as indicated in FIGS. 5 and 6.

Per the invention, the spin media can be located in a crystal eg. of, ferro electric or photo refractive material, a liquid crystal and other similar paramagnetic crystals or such spin media can be located in a concentrated gas of cesium or rare earth ions.

Also, in another embodiment of the invention, laser and photorefractive units may be replaced by direct write non-coherent data inputs such as white light, IR or UV light.

The computational machine of the present invention extends the Turing thesis to enable dynamic, general purpose quantum computing. In the present invention, this is taken to mean that the data are physically realized as quantum-mechanical spin states of nuclear and electronic species, rather than bunches of electrons (per the prior art) which employs voltages corresponding to Boolean 1 and 0 states.

Also the quantum-mechanical spin-based computers of the invention, have the potential for digital data output where radix=2, per a companion patent application filed herewith. Both inventive systems result in superior information content and signal/data bandwidth for the quantum-mechanical UTM. Both embodiments of the invention are believed to greatly exceed the state of the art which is achieved by creation of an instruction set architecture (essentially the dynamic hardware/software system intelligence) which is capable of operating as a multidimensional alternating UTM.

Referring again to FIG. 7, for 2 level spin states (radix=2), as further discussed in the companion application filed herewith, one flips either "n" spins or "e" spins. That is, one operates either the RF source/sensor of, eg. FIG. 5 to excite and read the "n" spin flips up or down or one operates the MW source/sensor to excite and read the "e" spin flips up or down to obtain 2 level, binary or digital data.

For greater than 2 level spin states or radix>2, one flips "n" spins and "e" spins per the invention described herein.

Figure 11:
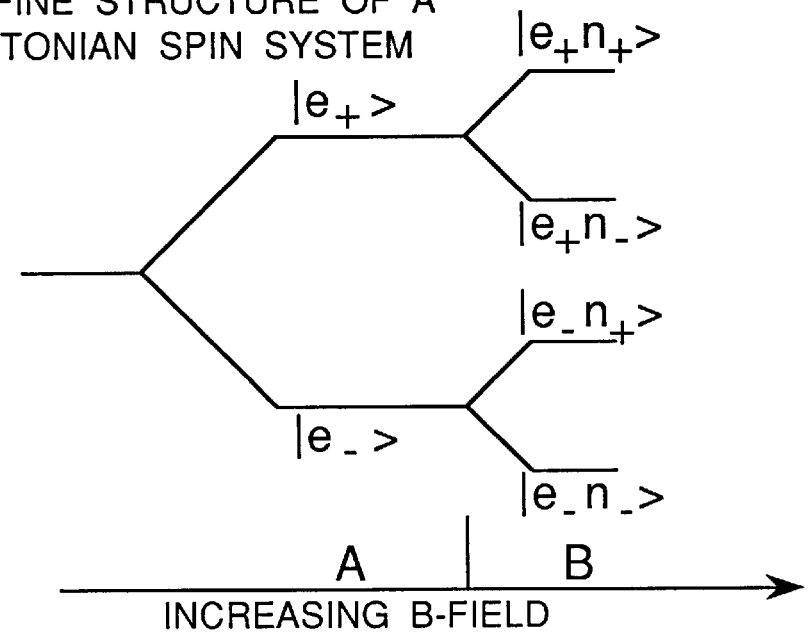

The 4 energy levels shown in FIG. 12 are also indicated in FIG. 11 where R=2 at "A" goes to R>2 at "B"). That is, at "A", two level spin states can be detected in a Hamiltonian system that exhibits fine structure. At "B" >2, eg. 4 level spin states can be detected in a Hamiltonian system that exhibits hyperfine structure.

Also per the present invention, the above 4 energy levels permit radix-4 finite state quantum logic using quantum spin states as logic levels and photon-induced spin transitions as connectives of that four state logic. Such four state logic can be expanded to yet higher radix algebras and higher order quantum logics, eg. R>2 to 14 or more, including radix=4, 8 or 12. This can be performed by exploiting material systems with larger numbers of measurable spin states. For example, doped $Bi_{12}SiO_{20}$, sillenite crystals show a rich ENDOR spin structure, including hyperfine and quadrupole lines.

Referring again to FIG. 10 which shows a radix 4 state, if one add, eg a second electron (eg. by directing a laser beam at the spin media) to orbit the nucleus shown, radix 4 goes to radix 8. Or if a third electron be added, the number of combinations goes to radix 16. Or if one add a proton to the nucleus, the radix values also multiply greatly.

It can be seen per the invention, that quantum-mechanical spin systems offer the ability to perform calculations in higher radix than 2, and logic operations with more than two logical truth states, which are employed to advantage by the quantum computer of the present invention, which can encode and process radix>2 data.

For a farther discussion of higher radix data processing employed by the quantum computer of the invention, see an Article entitled *Radix-R>2 Quantum Computation*, by S. P. Hotaling, published in "Proc. International Quantum Structures Conf.", North Holland (July 1996), which Article is incorporated herein by reference.

Also by employing higher electric power, one can increase the B field suficiently to induce more spin states in the "2 level" materials employed in the spin media of the invention. The so employed materials include crystals of, eg. doped $Bi_{12}SiO_{20}$, GaAs, $LiNbO_3$ and other electro-optic paramagnetic crystals (eg. GaInP) as well as polymers (eg. DCPVA) or spin glasses (eg. Fe doped silicate glasses) and other optically active, spinrich materials. Or one can employ higher spin state or radix >2 materials including by adding dopants, eg. Er, Mn, Cr and Fe to the above "2 level" materials with or without application of increased voltage.

The energy required to move bunches of electrons from one place in a transistor circuit to another (switching from 1 to 0). is clearly larger than the energy required to flip electron or nuclear spins. This decreased energy, gives a clear time advantage to spinbased computational devices per the present invention. In moving from prior art electronic (digital) computers to spin-based quantum computers one can considerably increase the speed and amount of information processed whether employing R=2 or R>2 spin state media per the present invention. The latter embodiment of the invention in employing R>2, obtains data compression over digital data as such radix can represent higher numerical values with fewer digits.

Thus the invention provides a universal Turing machine based upon photonic perturbation of quantum-mechanical nuclear and electronic spin states in condensed matter systems.

The general purpose quantum computer of the invention has applicability across the entire spectrum of information technology including information security cryptography, eg. for the protection of bank computer systems, cyrptoanalysis, probability calculations and many other uses including where ever conventional electronic computers are now used.

What is claimed is:

1. A method for general purpose quantum computing comprising,
   a) inputting a data signal through an encoder to encode said data signal with an instruction,
   b) transmitting the encoded signal by means of an L1 laser beam to an input buffer,
   c) directing a reference laser beam L2 so it interferes with said L1 beam in said buffer to form an interference pattern therein as a hologram, IPH,
   d) directing a read laser beam L3 through said IPH and through a decoder which reads said instruction,
   e) said decoder presenting said instruction on the L3 beam to ALU spin media in a magnetic field, which respond to said instruction by flipping spins in one or more sequences to resulting data patterns and reading said patterns to derive results therefrom.

2. The method of claim 1 wherein said patterns are read by sensors selected from the group consisting of radio frequency (RF), microwave (MW), optical sensors and a combination thereof.

3. The method of claim 1 wherein said spins are nuclear ("n") and electronic ("e") spins flipped between >2 energy levels to obtain and output radix >2 data.

4. The method of claim 3 wherein said spins are flipped between 4 energy levels.

5. The method of claim 1 wherein the spin media has at least one material selected from the group consisting of doped $Bi_{12}SiO_{20}$, GaAs, $LiNbO_3$, GaInP, DCPVA and Fe doped silicate glasses.

6. The method of claim 1 wherein at least one sensor outputs a data signal according to said resulting patterns.

7. The method of claim 1 wherein said spin media react to said instruction with a programed response.

8. The method of claim 1 wherein said spin media responds to said instruction according to a system Hamiltonian.

9. The method of claim 1 wherein said spin media is positioned in the field of a microwave source/sensor.

10. The method of claim 1 wherein said spin media is positioned in a field of RF source/sensor.

11. The method of claim 1 wherein said spin media is positioned in a field of both MW source/sensor and RF source/sensor.

12. The method of claim 11 wherein said media has nuclear and electron spins and said electron spins are excited by said MW field and read by said MW sensor and said nuclear spins are excited by said RF field and read by said RF sensor.

13. The method of claim 1 wherein a laser beam is passed through said spin media to a beam detector which optically detects the above spin inversions in a data pattern and transmits same to an optical multi-channel analyzer for detecting one or more sequences of said spin flips by reading optical frequency shifts thereof and outputs optical data therefrom.

14. The method of claim 3 wherein a succession of decoded instructions are presented to said spin media which causes spins to flip in successive sequences into resulting data patterns which are read by at least one of said sensors which output a stream of data signals or computational results according to said resulting patterns.

15. The method of claim 1 wherein a data signal that is input through said encoder is input from a source selected from the group consisting of a keyboard, a camera, a digital computer and a bar code scanner.

16. An apparatus for general purpose quantum computing comprising,
   a) means for inputting a data signal through an encoder to encode said data signal with an instruction,
   b) means for transmitting the encoded signal by means of an L1 beam to an input buffer, c) means for directing a reference beam L2 so it interferes with said L1 beam in said buffer to form an interference pattern therein as a hollogram, IPH, d) means for directing a read beam L3 through said IPH and through a decoder which reads said instruction, e) said decoder presenting said instruction on the L3 beam to ALU spin media in a magnetic field, which respond to said instruction by flipping spins in one or more sequences to resulting data patterns and means for reading said patterns to derive results therefrom.

17. The apparatus of claim 16 having at least one sensor to output a data signal according to said resulting patterns.

18. The apparatus of claim 16 having sensors to read said patterns selected from the group consisting of RF, MW, optical sensors and a combination thereof.

19. The apparatus of claim 16 having means to flip said "n" and "e" spins between >2 energy levels to obtain and output radix >2 data.

20. The apparatus of claim 16 having at least one sensor to output a data signal according to said resulting patterns.

21. The apparatus of claim 16 wherein said spin media is positioned in the field of a microwave source/sensor.

22. The apparatus of claim 16 wherein said spin media is positioned in a field of an RF source/sensor.

23. The apparatus of claim 16 wherein said spin media is positioned in a field of both an MW source/sensor and an RF source/sensor.

24. The apparatus of claim 23 wherein said media has nuclear and electron spins and said electron spins are excited by said MW field and read by said MW sensor and said nuclear spins are excited by said RF field and read by said RF sensor.

25. The apparatus of claim 16 having means to pass a laser beam through said spin media to a beam detector which optically detects the above spin inversions in a data pattern and transmits same to an optical multi-channel analyzer for detecting one or more sequences of said spin flips by reading optical frequency shifts thereof and means to output optical data therefrom.

26. The apparatus of claim 16 wherein the means to input the data signal through said encoder is selected from the group consisting of a keyboard, a camera, a digital computer and a bar code scanner.

* * * * *

UNITED STATES PATENT AND TRADEMARK OFFICE
CERTIFICATE OF CORRECTION

PATENT NO. : 5,838,436

DATED : November 17, 1998

INVENTOR(S) : Hotaling

It is certified that error appears in the above-identified patent and that said Letters Patent is hereby corrected as shown below:

On the Title Page, Item [75] Inventors: "Stephen P. Hotaling" should read ----- Steven P. Hotaling -----.

Signed and Sealed this

Third Day of April, 2001

*Attest:*

NICHOLAS P. GODICI

*Attesting Officer*  *Acting Director of the United States Patent and Trademark Office*